United States Patent
Solomon et al.

(10) Patent No.: US 12,023,757 B2
(45) Date of Patent: Jul. 2, 2024

(54) AIR MANAGEMENT SYSTEM FOR LASER WELDING WITH AIRFLOW OPTIMIZING DEFLECTOR

(71) Applicant: GM GLOBAL TECHNOLOGY OPERATIONS LLC, Detroit, MI (US)

(72) Inventors: Joshua Lee Solomon, Berkley, MI (US); Kuo-huey Chen, Troy, MI (US); Blair E Carlson, Ann Arbor, MI (US); Baixuan Yang, Troy, MI (US); Ahmed Alkhafaji, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 17/456,037

(22) Filed: Nov. 22, 2021

(65) Prior Publication Data

US 2023/0158605 A1     May 25, 2023

(51) Int. Cl.
*B23K 26/142*     (2014.01)
*B23K 26/14*     (2014.01)
*B23K 26/21*     (2014.01)

(52) U.S. Cl.
CPC .......... *B23K 26/142* (2015.10); *B23K 26/147* (2013.01); *B23K 26/1476* (2013.01); *B23K 26/21* (2015.10)

(58) Field of Classification Search
CPC ................ B23K 26/142; B23K 26/147; B23K 26/1476; B23K 26/123; B23K 26/14; B23K 26/1438; B23K 1/0056; B23K 2101/34; B23K 2103/04; B23K 26/125; B23K 26/16; B23K 26/211; B23K 26/382; B23K 1/0008; B23K 1/19; B23K 15/0046; B23K 15/0093; B23K 2101/006; B23K 2101/18;

(Continued)

(56) References Cited

U.S. PATENT DOCUMENTS 6,316,743 B1 *  11/2001  Nagahori .............. B23K 26/123
    219/121.72
6,531,682 B1 *  3/2003  Guttler ................. B23K 26/147
    219/121.84

(Continued)

OTHER PUBLICATIONS

Bergmann & Steffen GmbH. (Sep. 2018). Remote laser welding—Blower airknife for weld scanner optics and air management in laser welding cells. Retrieved on Nov. 22, 2021 https://www.apricon.fi/wp-content/uploads/tornadoblade.pdf.

*Primary Examiner* — Chris Q Liu
(74) *Attorney, Agent, or Firm* — Lorenz & Kopf LLP

(57) ABSTRACT

Air management systems are provided for optimizing airflow in laser welding with deflectors. A system for a welder includes a blower to generate an airflow stream. A plenum receives the airflow stream, directs it toward the workpiece, and defines an outlet facing the workpiece to expel the airflow stream toward the workpiece. A deflector adjacent the outlet is formed as a conical section converging from the plenum toward the workpiece, and is defined by an angled wall with an open center. The deflector concentrates the airflow stream to impart a velocity increase to the airflow stream after leaving the outlet and to impart a favorable directional component to the airflow stream toward a weld zone, as well as protecting the laser lens by increasing the downward momentum force of the air stream to eliminate the potential of spatter impinging the lens.

20 Claims, 4 Drawing Sheets

(58) Field of Classification Search
CPC ............ B23K 2101/35; B23K 2103/08; B23K 2103/10; B23K 2103/50; B23K 26/04; B23K 26/046; B23K 26/0648; B23K 26/0665; B23K 26/0869; B23K 26/0884; B23K 26/10; B23K 26/1435; B23K 26/146; B23K 26/1462; B23K 26/1464; B23K 26/24; B23K 26/242; B23K 26/244; B23K 26/322; B23K 26/38; B23K 26/389; B23K 26/40; B23K 26/702; B23K 35/325; B23K 9/0026
USPC ............ 219/121.84, 121.71, 121.13, 121.14, 219/121.47, 121.64, 121.67, 121.7, 219/121.72
See application file for complete search history.

(56) References Cited

U.S. PATENT DOCUMENTS

| | | | | |
|---|---|---|---|---|
| 6,649,866 | B2* | 11/2003 | Reichmann | B23K 26/0665 219/121.84 |
| 7,214,904 | B2* | 5/2007 | Zeltner | B23K 26/16 219/121.84 |
| 9,102,009 | B2* | 8/2015 | Dackson | B23K 26/24 |
| 2004/0226927 | A1* | 11/2004 | Morikazu | B23K 26/142 219/121.84 |
| 2008/0000881 | A1* | 1/2008 | Storm | C23C 8/24 219/121.47 |
| 2014/0144893 | A1* | 5/2014 | Yang | B23K 9/0026 219/137 R |
| 2015/0041443 | A1* | 2/2015 | Darzi | B23K 26/211 219/121.13 |

* cited by examiner

AIR MANAGEMENT SYSTEM FOR LASER WELDING WITH AIRFLOW OPTIMIZING DEFLECTOR

INTRODUCTION

The present disclosure generally relates to laser welding and more specifically, to airflow management and optimization in laser welding to avoid the effects of weld zone plume emissions for positive effects on workpiece weld quality.

In laser welding, a high density light source is employed to melt the material of the parts to be joined. Multiple parts are typically placed in contact with each other or with no more than a small gap at a faying interface between the parts. The laser beam is passed across the faying interface by the welding machine to fuse the parts together. At the point where the laser beam intersects the parts, a pool of melted material is formed in a heated area that comingles the material of the parts being joined.

In some forms of laser welding, both melted material and metal vapor may be formed. The metal vapor may displace a region of melted material in the melt pool, such as at point the laser beam enters the parts. The region of displaced material may be referred to as the keyhole. Vaporization of some material may occur, such as due to high density laser energy heating the material to a boiling point. As the vaporized material leaves the material surface, recoil pressure is generated which pushes the melt surface causing displacement. Small particles may be emitted in the form of a plume of opaque material. The plume may dampen the laser beam during its route to the workpiece. The metal vapor may also agglomerate into larger sized particles, which when approaching or surpassing the size of the laser beam's wavelength, may significantly attenuate the laser's power from reaching the workpiece. Effects of the plume may include inconsistency of laser power reaching to the material which may cause quality issues such as insufficient laser penetration, spatters, and cavities.

Accordingly, it is desirable to provide systems for laser welding that effectively and efficiently overcome the effects associated with plume formation and other emissions. Furthermore, other desirable features and characteristics of the present invention will become apparent from the subsequent detailed description and the appended claims, taken in conjunction with the accompanying drawings and the foregoing technical field and background.

SUMMARY

In various embodiments, systems with air management aspects are provided for laser welding to reduce the effects of plume forming actions and for optimizing airflow with deflectors. In a number of embodiments, a system for a welder includes a blower to generate an airflow stream. A plenum receives the airflow stream, directs it toward the workpiece, and defines an outlet facing the workpiece to expel the airflow stream toward the workpiece. A deflector adjacent the outlet is formed as a conical section converging from the plenum toward the workpiece, and is defined by an angled wall with an open center. The deflector concentrates the airflow stream to impart a velocity increase to the airflow stream after leaving the outlet and to impart a favored directional component to the airflow stream toward a weld zone.

In additional embodiments, the deflector includes a smooth surface that the airflow stream follows, and the smooth surface is configured to reduce turbulence of the airflow stream.

In additional embodiments, the angled wall of the deflector is disposed at an angle in a range of approximately 35-40 degrees relative to vertical.

In additional embodiments, the deflector extends from a top proximate the plenum to a bottom distant from the plenum, wherein the top is disposed radially inside the opening, in entirety.

In additional embodiments, the deflector extends from a top proximate the plenum to a bottom distant from the plenum, wherein the top is disposed radially outside the opening, in entirety.

In additional embodiments, the deflector has a height in a direction from the plenum toward the workpiece, of approximately three centimeters.

In additional embodiments, the deflector is formed by additive manufacturing with a surface quality configured to limit airflow friction.

In additional embodiments, the welder is configured to generate a laser beam configured to follow a path. The plenum is an annular shaped plenum with an open center. The deflector is an annular shaped deflector with an open center aligned with the plenum's open center around the path of the laser beam.

In additional embodiments, the deflector is joined to the plenum with an airtight joint.

In additional embodiments, the welder includes a fixture with clamps configured to engage the workpiece. The weld zone is defined between the clamps and the deflector is configured to concentrate and direct the airflow stream to a point between the clamps.

In a number of additional embodiments, a welder is configured to weld a workpiece at a weld zone. A blower is configured to generate an airflow stream and a plenum is coupled with the blower to receive the airflow stream and to direct the airflow stream toward the workpiece. The plenum defines an annular outlet configured to face toward the workpiece and to expel the airflow stream toward the workpiece. A deflector is disposed adjacent the outlet, and is formed as a conical section converging from a top proximate the plenum to a bottom distant the plenum. The deflector is defined by an annular wall with an open center to concentrate the airflow stream to impart a velocity increase to the airflow stream after leaving the outlet and to impart a directional component to the airflow stream toward the weld zone.

In additional embodiments, the deflector includes a smooth surface adjacent the airflow stream. The airflow stream follows the smooth surface and the smooth surface reduces turbulence of the airflow stream.

In additional embodiments, the annular wall of the deflector is disposed at an angle in a range of approximately 35-40 degrees relative to vertical, and the deflector is axisymmetric.

In additional embodiments, the top of the deflector is disposed radially inside the opening, in entirety.

In additional embodiments, the top of the deflector is disposed radially outside the opening, in entirety.

In additional embodiments, the deflector has a height from the top to the bottom, of no more than three centimeters.

In additional embodiments, the deflector is formed of a rigid material by additive manufacturing with a surface quality configured to limit airflow friction.

In additional embodiments, the welder generates a laser beam configured to follow a path. The plenum comprises an annular shaped plenum with an open center. The deflector comprises an annular shaped deflector also with an open center. The open centers are aligned around the path of the laser beam, and the deflector extends radially inward further than the plenum.

In additional embodiments, the deflector is joined to the plenum with an airtight joint. The plenum is spaced from the welder by a gap, and the deflector is configured to induce an induced flow through the gap.

In a number of other embodiments, a system includes a welder configured to weld a workpiece at a weld zone. A blower is configured to generate an airflow stream. A plenum is configured to receive the airflow stream and to direct the airflow stream toward the workpiece. The plenum defines an annular outlet configured to face toward the workpiece and to expel the airflow stream toward the workpiece. A deflector is disposed adjacent the outlet. The deflector is formed as a conical section converging from the plenum toward the workpiece. The deflector is defined by a wall with an open center. The wall is disposed at an angle of approximately 35-40 degrees relative to vertical. The deflector is configured to concentrate the airflow stream to impart a velocity increase to the airflow stream after leaving the outlet and to impart a directional component to the airflow stream toward the weld zone. The welder includes a fixture with clamps configured to engage the workpiece. The weld zone is defined between the clamps and the deflector is configured to concentrate and direct the airflow stream to a point between the clamps.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, systems are provided that include airflow optimization through an air management system that creates generated, plume managing, airflow in laser welding operations. In a number of embodiments, forced and induced airflow is generated near the source of the welder's laser light beam. A deflector concentrates the airflow, increases velocity of the airflow, imparts a strong directional vector to the airflow magnitude, and counteracts airflow disturbing influences. The deflector effectively and efficiently reduces the effect of plumes and other emissions generated above a weld zone. The generated flow stream distribution consistently moves the plume away from the weld zone, avoiding laser energy loss due to plume effects and improves weld quality. In a number of embodiments, the deflector is configured as a conical section, such as a conical convergent nozzle. The deflector reduces airflow turbulence and defines an effective airflow direction. The resulting airflow enhances protection of the laser's optics lenses, and also increases airflow amount and magnitude toward the weld zone to move more plume away from the weld zone. Improvements of up to 25% gain in mass flow rate from the weld area have been demonstrated. The results include weld quality improvements.

Figure 1:
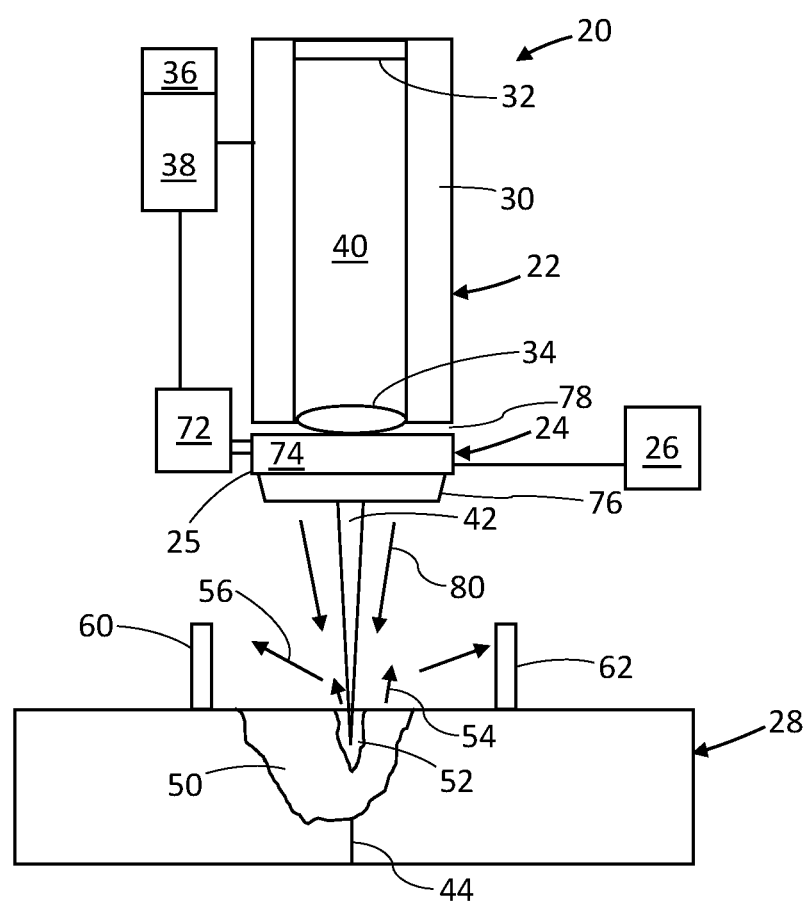
FIG. 1 is a schematic illustration of a laser welding system, in accordance with various embodiments.

With reference to FIG. 1, illustrated is a welding system 20 employing aspects that create optimized, generated airflow for quality weld production. In general, the welding system 20 includes a welding machine 22, an air management system 24, and a workpiece 28. The welding machine 22 may be any of a variety of types of welders and in the current embodiment is a laser welding machine. As such, the welding machine 22 includes a light source 30, a reflector 32, optics 34, a power supply 36 and a controller 38. The light source 30 is powered and controlled by the power supply 36 and the controller 38 to generate light into a resonant cavity 40. The light is expanded and then reflected by the reflector 32 through the optics 34 to emerge as a concentrated beam 42 focused to a point at the workpiece 28. The welding machine 22 is configured to move the beam across the workpiece 28 along a designated welding route. The air management system 24 may include an airflow module 25 disposed beneath laser optics 34. In embodiments, the optics and the airflow module may be held by robot arm/gantry system 26. The laser power used in certain embodiments such as automotive applications may range from 1 kw to 10 kw. The generator may be configured as stand-alone equipment standing on the floor, with fiber optics delivering the laser light from the laser generator to the laser optics 34 to for laser welding.

The beam 42 is directed at the workpiece 28 and as such passes through an air space that is subject to air movement and contaminant exposure. The workpiece 28 may be plural parts, such as for joining at a faying interface 44. The beam 42 is directed at the faying interface 44 creating a melt pool 50. In the current embodiment, keyhole type laser welding is employed. As the high energy-density beam 42 traverses along the faying interface 44, the melt pool 50 develops. The surface material being directly hit by the beam heats up to evaporation point and evaporates. As the metal vapor leaves the surface, it generates recoil pressure which forces away the melt beneath forming a deep and narrow cavity referred to as a keyhole 52 that penetrates the molten material. Near-surface plasma emissions 54 may occur and particles may flow out of the weld pool 50 and the keyhole 52 forming a plume 56. The plume 56 may dampen the beam 42 from reaching the workpiece 28. It has been discovered that characteristics of the plume 56 may be related to surrounding airflow velocity and direction. It has further been discovered that fixtures of the welding machine 22 proximate to the weld pool 50 create airflow profiles that exacerbate the effects of the plume 56. For example, clamps 60, 62 used to hold the workpiece 28, such as to maintain an acceptable gap size at the faying interface 44, may create airflow vectors that direct the plume 56 into the path of the beam 42. In addition, fixtures such as the clamps 60, 62 may block or redirect airflow concentrating the plume 56. It has also been discovered that beam damping from the plume 56 may cause varying laser power decreases at the workpiece 28. Even when employing monitoring, the controller 38 may be unable to make changes to compensate for these variations. As a result, consistently maintaining the keyhole 52 may not be possible leading to closing and opening that increases spatter, plume emissions, and may lead to reduced weld quality. In addition to damping of the beam 42 by the plume 56, spatter may cloud or damage the optics 34 of the welding machine 22, and is therefore undesirable.

Accordingly, to reduce effects of the plume 56 the current embodiment employs an air management system 24 to create an optimized airflow profile to effectively move the plume 56 out of the path of the beam 42, including to overcome any effects such as those caused by the clamps 60, 62. The air management system 24 generally includes a blower 72, a plenum 74 and a deflector 76. The blower 72 generates pressurized airflow that is delivered to the plenum 74. The blower 72 may be of a variety of constructions such as a motor driven squirrel cage centrifugal fan or other arrangement. The plenum 74 may be of an enclosed annular shaped construction and may completely surround the beam 42 near its exit from the optics 34. The plenum 74 has an open center 78 through which the beam 42 may pass. The pressurized airflow, along with induced airflow drawn through a gap 78, is expelled through a deflector 76 toward the workpiece 28 in a stream 80. The stream 80 is optimized to disperse the plume 56 out of the path of the beam 42 and away from the weld zone, reducing or eliminating unwanted plume 56 effects. For example, the stream 80 is generated as a vector with sufficient velocity and uniform directional strength to redirect the plume 56. In addition, the stream 80 is directed on a relatively small area of interest that may increase the downward momentum force of the air stream 80 and overcome airflow disturbances, such as those caused by fixturing or turbulence. As a result, protection from contamination is provided for the optics 34, and airflow in the weld zone is beneficially directed for better quality laser welding.

Figure 2:
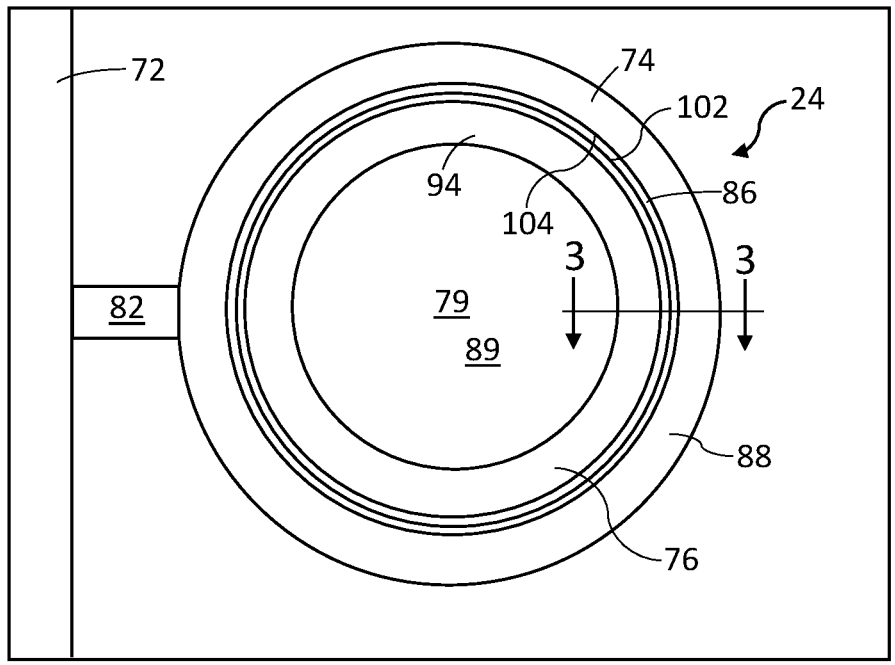
FIG. 2 is a fragmentary, schematic illustration of a part of the laser welding system of FIG. 2, showing a plenum and deflector area, in accordance with various embodiments.
Figure 3:
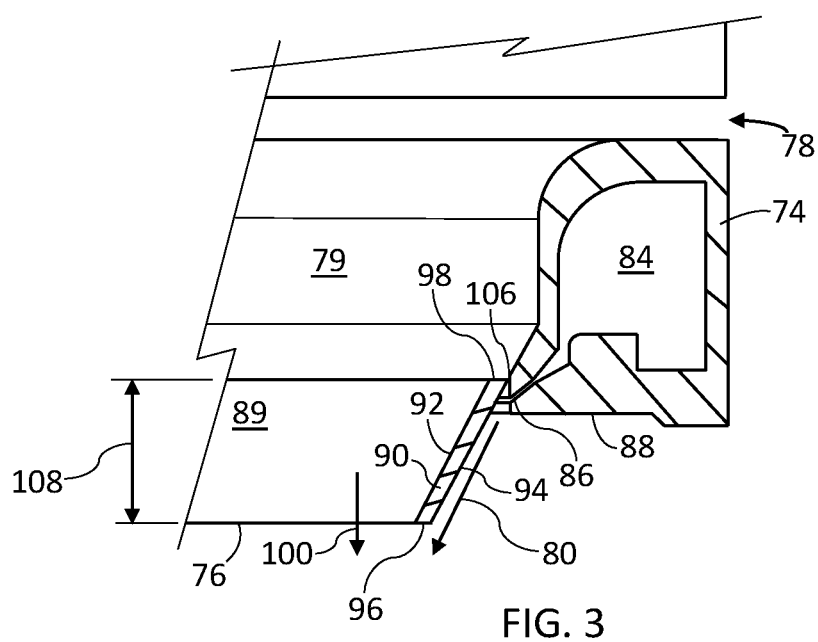
FIG. 3 is a section view taken generally through the line 3-3 indicated in FIG. 2, in accordance with various embodiments.

Referring to FIG. 2, a schematic illustration shows the area of the air management system 24 that faces the workpiece 28 (i.e. the bottom of the air management system 24 of FIG. 1). The blower 72 directs airflow into the plenum 74 through a duct 82. The plenum 74 is generally annular in shape with an open center 79. Referring additionally to FIG. 3, the plenum 74 defines a chamber 84 into which the duct 82 directs airflow, and includes an outlet 86 that is directed at the workpiece 28. In the current embodiment, the outlet 86 is in the form of an annular slot through which airflow is directed generally downward toward the workpiece 28. The deflector 76 is attached to, or integrally formed with, the plenum 74 adjacent the outlet 86, and at or near its bottom surface 88.

The deflector 76 is shaped as a conical section defined by an annular wall 90, and may be described as a conical convergent nozzle with an open center 89 aligned with the open center 79 of the plenum 74. The deflector 76 is formed of a relatively thin material by the annular wall 90 with an inner surface 92 and an outer surface 94. The bottom 96 of the deflector 76 has a smaller diameter than the top 98 of the deflector 76 drawing the airflow stream 80 toward the beam 42. In this embodiment, the deflector 76 is disposed slightly above the bottom surface 88 so that the outlet 86 is disposed radially outside the deflector 76. Accordingly, the airflow stream 80 exiting the outlet 86 passes along the outer surface 94 of the deflector 76. As the stream 80 passes the bottom 96 of the deflector 76, additional induced airflow 100 is drawn through the gap 78 joining the stream 80.

Positioning the deflector 76 at or near the bottom of the plenum 74 locates the top 98 adjacent the inside 102 of the outlet 86 and proximate the plenum 74. The bottom 96 of the deflector 76 is located distant from the plenum relative to the top 98. This leaves the area of the outlet 86 from its inside 102 to its outside 104 completely open and unobstructed all the way to the workpiece 28. Close proximity of the deflector 76 to the outlet 86 optimizes the ability of the deflector to define the characteristics of the stream 80 as it is directed at the workpiece 28. This ability is improved by providing an airtight joint 106 between the top 98 of the deflector 76 and the plenum 74. In addition, optimized airflow is created by the deflector 76 with a height 108 of three centimeters, or of approximately three centimeters, from the top 98 to the bottom 96, and with an axisymmetric shape to create an axisymmetric stream 80. The height 108 is selected to minimize airflow loss due to friction on the wall 90. The material of the deflector 76 is selected to have a surface quality to limit friction and provide laminar flow with the air flowing efficiently and smoothly increasing in speed across the boundary layer. The material of the deflector 76 may be a plastic, a metal, or a polymer, exhibiting a smooth inner surface 92 to reduce turbulence and exhibiting a sufficiently rigid form to maintain shape under application of the air flow. In a number of embodiments, the deflector 76 may be economically manufactured by printing using an additive manufacture process.

Figure 4:
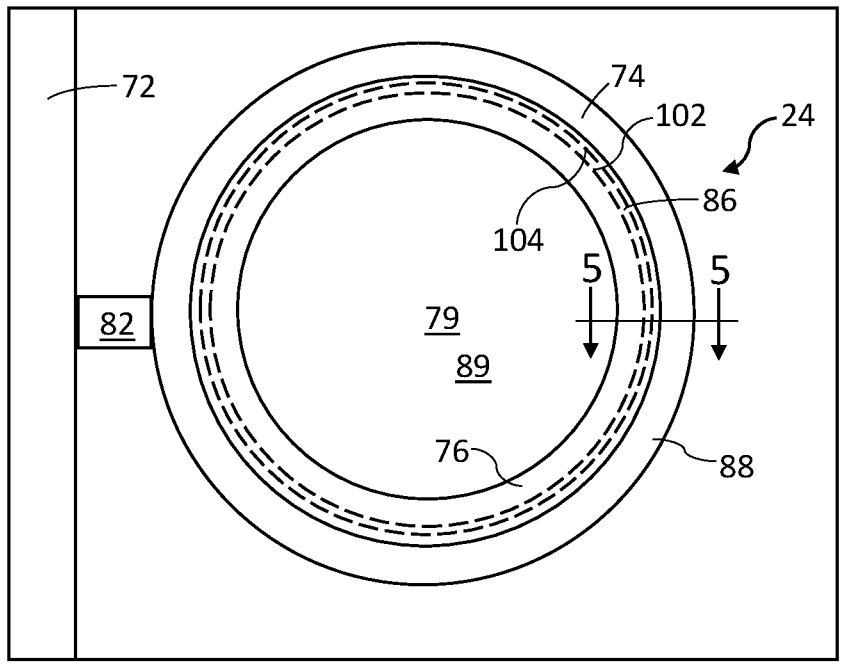
FIG. 4 is a fragmentary, schematic illustration of a part of the laser welding system of FIG. 2, showing a plenum and deflector area, in accordance with various embodiments.
Figure 5:
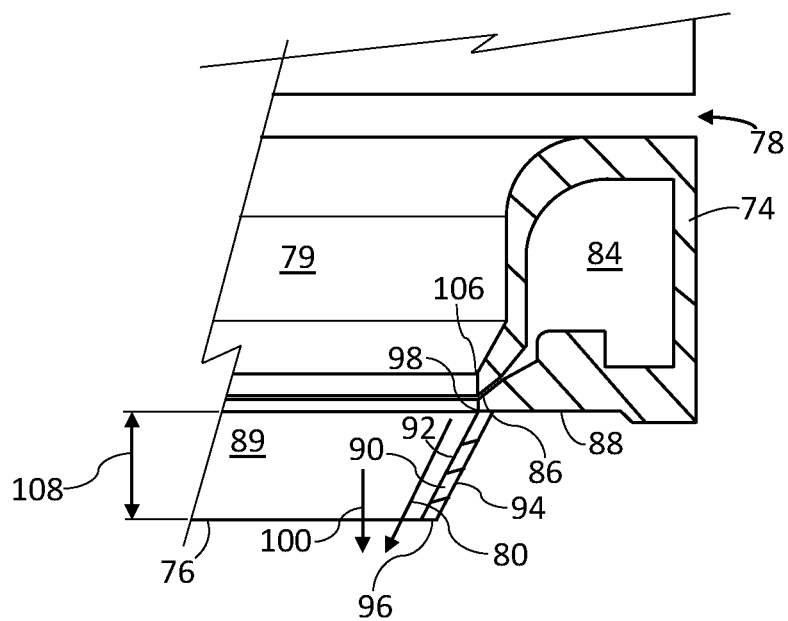
FIG. 5 is a section view taken generally through the line 5-5 indicated in FIG. 4, in accordance with various embodiments.

Referring to FIGS. 4 and 5, an alternative placement of the deflector 76 is illustrated. In this configuration, the deflector is disposed with the top 98 of the wall 90 at the bottom surface 88, radially outward from, and adjacent to, the outside 104 of the outlet 86. Other attributes of the deflector 76 are the same or similar to those of the arrangement of FIGS. 2 and 3. The deflector 76 is again shaped as a conical convergent nozzle with an open center 89 aligned with the open center 79 of the plenum 74. The deflector 76 is formed of a relatively thin material by an annular wall 90 with an inner surface 92 and an outer surface 94. The bottom 96 of the deflector 76 has a smaller diameter than the top 98 of the deflector 76 directing the airflow stream 80 toward the beam 42. In this embodiment, the deflector 76 is disposed at the bottom surface 88 so that the outlet 86 is disposed radially inside the deflector 76. Accordingly, the airflow stream 80 exiting the outlet 86 passes along the inside surface 92 of the deflector 76. As the stream 80 passes through the deflector 76, additional induce airflow 100 is drawn through the gap 78 joining into the stream 80.

Positioning the deflector 76 at the bottom of the plenum 74 locates the top 98 adjacent the outside 104 of the outlet 86. This positions the deflector 76 so that is between the area of the outlet 86 from its inside 102 to its outside 104 and the workpiece 28. Close proximity of the deflector 76 to the outlet 86 optimizes the ability of the deflector to define the characteristics of the stream 80 as it is directed at the workpiece 28. This ability is improved by providing an airtight joint 106 between the top 98 of the deflector 76 and the plenum 74. In addition, optimized airflow is created by the deflector 76 with a height 108 of three centimeters, or of approximately three centimeters, from the top 98 to the bottom 96, and with an axisymmetric shape to create an axisymmetric stream 80. The height 108 is selected to minimize airflow loss due to friction on the wall 90. The material of the deflector 76 is selected to provide laminar flow with the air flowing efficiently and smoothly increasing in speed across the boundary layer. The material may be a plastic, a metal, or a polymer, exhibiting a smooth inner surface 92 to reduce turbulence and of a sufficiently rigid form to maintain shape under the applied air flow. Again, the deflector 76 may be economically manufactured by printing using an additive manufacture process.

Figure 6:
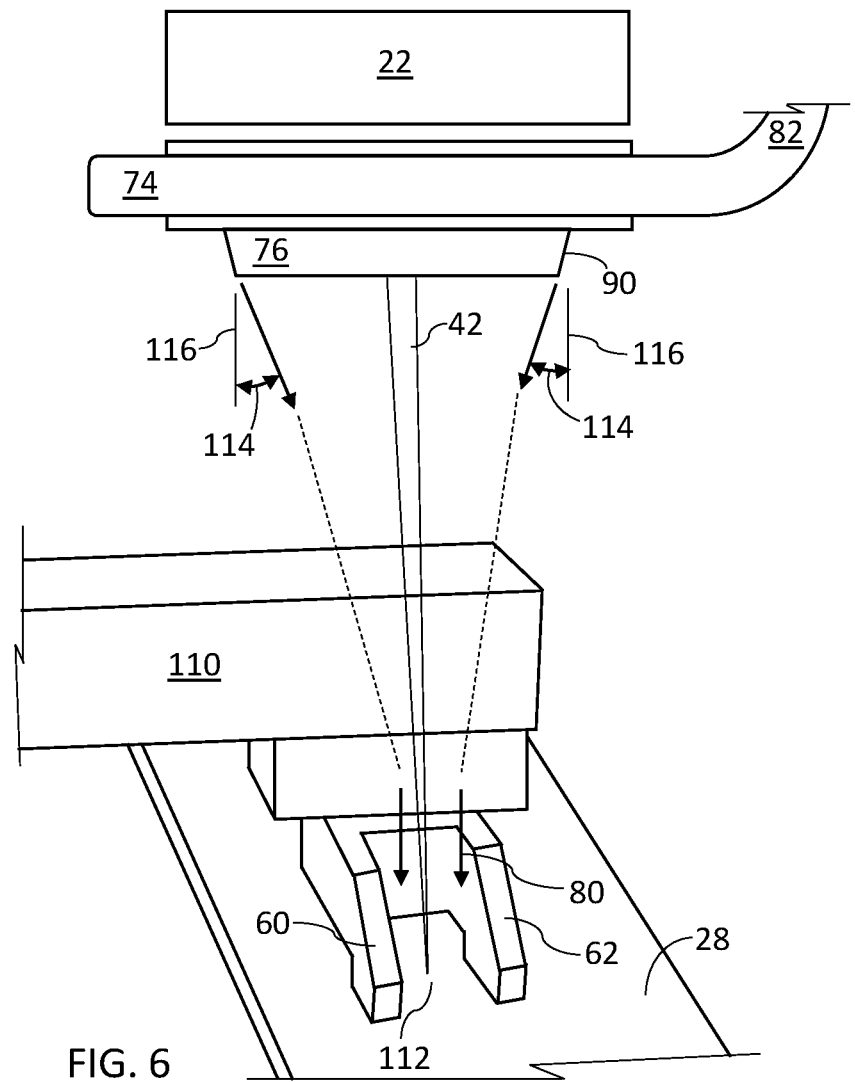
FIG. 6 is an illustration of a welding process application of the laser welding system of FIG. 1, in accordance with various embodiments.

Referring to FIG. 6, the welding machine 22 has a fixture 110 that includes the clamps 60 and 62. A weld zone 112 is defined between the clamps 60 and 62 and at the workpiece 28. Both the inner (FIGS. 2-3) and outer (FIGS. 4-5) locations of the deflector 76 direct the airflow stream 80 in an optimized fashion to the weld zone 112. In each case, the deflector 76 extends radially inward further than the plenum 74. Specifically, the stream 80 is directed between the clamps 60 and 62 and along and around the beam 42. Up to a 25% gain in mass flow rate from the weld area has been demonstrated by inclusion of the deflector 76. The wall 90 of the deflector 76 is angled/tapered so that it is disposed at an angle 114 relative to vertical 116. The angle 114 is consistent around the perimeter of the deflector 76 and may be within a range of thirty-five to forty degrees (35°-40°) in magnitude relative to vertical 116. In an embodiment, the stream 80 is optimized with an angle 114 of thirty-seven and one-half degrees (37.5°). These parameters have been found to effectively disperse and redirect the plume 56 away from the weld zone 112 and out of the path of the beam 42.

Accordingly, a system includes a laser welder with an airflow management system that effectively avoids plume and spatter effects producing quality welds. Forced and induced airflow may be generated near the source of the welder's laser light beam. A deflector concentrates the generated airflow, increasing velocity and imparting a strong directional vector to the airflow magnitude. Airflow disturbing influences such as turbulence are overcome to reduce the effects of plumes generated above the weld zone. The airflow management system boosts and directs air flow onto the welding site and moves away the plume. Consistent laser energy input into the workpiece and consistent weld quality are provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for a welder configured to weld a workpiece at a weld zone, the system comprising:
    a welding machine;
    a blower configured to generate an airflow stream;
    a plenum defining a chamber configured to receive the airflow stream and the plenum defining an outlet from the chamber, the outlet configured to direct the airflow stream toward the workpiece, the plenum having a structure defining a chamber with an outlet configured to face toward the workpiece and to expel the airflow stream toward the workpiece, the plenum disposed with an air gap defined between a lens of the welding machine and the structure of the plenum;
    a deflector disposed adjacent the outlet, the deflector formed as a conical section defined by an angled wall, the conical section converging from the plenum toward the workpiece, the deflector defined by the angled wall with an open center, the angled wall disposed spaced away from the welding machine and on an opposite side of both the air gap and the plenum relative to the welding machine, the conical section converging from the plenum toward the workpiece, the deflector disposed downstream from the outlet in the airflow stream so that the airflow stream exits the chamber through the outlet prior to reaching the deflector,
    wherein the angled wall of the deflector is configured to concentrate the airflow and induce an induced airflow through the gap and into the open center, the induced airflow joining with the airflow stream within the deflector forming a combined stream,
    wherein the angled wall of the deflector imparts a velocity increase to the combined stream after leaving the outlet and imparts a directional component to the combined stream toward the weld zone, and is configured to induce the induced airflow through the air gap.

2. The system of claim 1, wherein the deflector includes a smooth surface that the airflow stream follows, the smooth surface configured to reduce turbulence of the airflow stream.

3. The system of claim 1, wherein the angled wall of the deflector is disposed at an angle in a range of 35-40 degrees relative to vertical.

4. The system of claim 1, wherein the deflector has a top facing the plenum and a bottom facing the workpiece, wherein the top is disposed radially inside the outlet, in entirety.

5. The system of claim 1, wherein the deflector has a top facing the plenum and a bottom facing the workpiece, wherein the top is disposed radially outside the outlet, in entirety.

6. The system of claim 1, wherein the deflector has a height in a direction from the plenum toward the workpiece, configured to minimize airflow loss due to friction on the angled wall.

7. The system of claim 1, wherein the deflector is formed by additive manufacturing with a surface quality configured to limit airflow friction.

8. The system of claim 1, wherein:
    the welder is configured to generate a laser beam configured to follow a path,
    the plenum comprises an annular shaped plenum with a first open center,
    the deflector comprises an annular shaped deflector with a second open center, and
    the first and second open centers are aligned around the path of the laser beam.

9. The system of claim 1, wherein the deflector is joined to the plenum with an airtight joint.

10. The system of claim 1, wherein:
    the welder includes a fixture with a first clamp configured to engage the workpiece, and a second clamp configured to engage the workpiece,
    the weld zone is defined between the first clamp and the second clamp, and
    the deflector is configured to concentrate and direct the airflow stream to a point between the first clamp and the second clamp.

11. The system of claim 1, wherein the deflector is joined to the plenum with an airtight joint, wherein the plenum is spaced from the welder by the air gap, wherein the deflector is configured to induce the induced flow through the air gap.

12. A system for a welder configured to weld a workpiece at a weld zone, the system comprising:
   a lens included in the welder and configured to generate a beam;
   a blower configured to generate an airflow stream;
   a plenum coupled with the blower and defining a chamber, the plenum configured to receive the airflow stream and the plenum defining an outlet from the chamber, the outlet configured to receive the airflow stream and direct the airflow stream toward the workpiece, the plenum defining an annular outlet from the chamber, the annular outlet configured to face toward the workpiece and to expel the airflow stream from the chamber and toward the workpiece, wherein an air gap is defined between the lens and the plenum;
   a deflector disposed adjacent the annular outlet, the deflector disposed between the annular outlet and the workpiece and has a top facing the plenum and a bottom facing the workpiece and is formed as a conical section defined by an annular wall, the conical section converging from the top to the bottom and from the plenum toward the workpiece, the deflector defined by the annular wall with an open center between the top and the bottom, the annular wall disposed downstream from the outlet in the airflow stream, so that the airflow stream exits the chamber through the outlet prior to reaching the deflector,
   wherein the conical section of the wall of the deflector concentrates the airflow stream and imparts a velocity increase to the airflow stream after leaving the outlet and imparts a directional component to the airflow stream toward the weld zone, and is configured to induce an induced airflow through the gap.

13. The system of claim 12, wherein the deflector includes a smooth surface adjacent the airflow stream, wherein the airflow stream follows the smooth surface, the smooth surface configured to reduce turbulence of the airflow stream.

14. The system of claim 12, wherein the annular wall of the deflector is disposed at an angle in a range of 35-40 degrees relative to vertical and the deflector is axisymmetric.

15. The system of claim 12, wherein the top of the deflector is disposed radially inside the annular outlet, in entirety.

16. The system of claim 12, wherein the top of the deflector is disposed radially outside the annular outlet, in entirety.

17. The system of claim 12, wherein the deflector has a height from the top to the bottom, of no more than three centimeters.

18. The system of claim 12, wherein the deflector is formed of a rigid material by additive manufacturing with a surface quality configured to limit airflow friction.

19. The system of claim 12, wherein:
   the welder is configured to generate the beam as a laser beam configured to follow a path,
   the plenum comprises an annular shaped plenum with a first open center,
   the deflector comprises an annular shaped deflector with a second open center,
   the first and second open centers are aligned around the path of the laser beam, and
   the deflector extends radially inward further than the plenum.

20. A system for a welder configured to weld a workpiece at a weld zone, the system comprising:
   a welding machine configured to generate a beam through a lens;
   a blower configured to generate an airflow stream;
   a plenum defining a chamber configured to receive the airflow stream and the plenum defining an outlet from the chamber, the outlet configured to direct the airflow stream toward the workpiece, wherein an air gap is defined between the lens and the plenum;
   a deflector disposed adjacent the outlet, the deflector formed as a conical section defined by a wall, the conical section converging from the plenum toward the workpiece, the deflector disposed downstream from the outlet in the airflow stream so that the airflow stream exits the chamber through the outlet prior to reaching the deflector,
   wherein the wall of the deflector is configured to concentrate the airflow stream to impart a velocity increase to the airflow stream after leaving the outlet and to impart a directional component to the airflow stream toward the weld zone, and is configured to induce an induced airflow through the air gap,
   wherein the welding machine includes a fixture with a first clamp configured to engage a workpiece, and a second clamp configured to engage the workpiece,
   wherein the weld zone is defined between the first clamp and the second clamp, and
   wherein the conical section of the deflector is configured to concentrate and direct the airflow stream with the induced airflow to a point between the first clamp and the second clamp.

* * * * *